United States Patent [19]
Zhuang

[11] Patent Number: 5,806,932
[45] Date of Patent: Sep. 15, 1998

[54] SEAT ADJUSTMENT AND DUMPING MECHANISM WITH MEMORY OF ADJUSTMENT

[75] Inventor: Jim Zhuang, Carmel, Ind.

[73] Assignee: P. L. Porter Co., Woodland Hills, Calif.

[21] Appl. No.: 686,251

[22] Filed: Jul. 25, 1996

[51] Int. Cl.⁶ ........................................ B60N 2/02
[52] U.S. Cl. ................ 297/361.1; 297/367; 297/369; 297/378.12
[58] Field of Search ................ 297/361.1, 364, 297/367, 369, 376, 378.12

[56] References Cited

U.S. PATENT DOCUMENTS

| | | | |
|---|---|---|---|
| 4,279,442 | 7/1981 | Bell | 297/367 |
| 4,372,610 | 2/1983 | Fisher, III et al. | 297/367 |
| 4,565,404 | 1/1986 | Rauschenberger | 297/369 X |
| 4,591,207 | 5/1986 | Nithammer et al. | 297/367 X |
| 4,611,853 | 9/1986 | Lehmann et al. | 297/367 X |
| 4,634,182 | 1/1987 | Tanaka | 297/367 X |
| 4,641,884 | 2/1987 | Miyashita et al. | 297/367 X |
| 4,666,210 | 5/1987 | Bianchi et al. | 297/361.1 X |
| 4,684,174 | 8/1987 | Bell | 297/367 |
| 4,795,213 | 1/1989 | Bell | 297/367 |
| 4,898,424 | 2/1990 | Bell | 297/367 |
| 4,913,494 | 4/1990 | Ikegaya | 297/367 |
| 5,265,936 | 11/1993 | Droulon et al. | 297/361.1 |
| 5,425,568 | 6/1995 | Sliney et al. | 297/378.12 X |
| 5,433,507 | 7/1995 | Chang | 297/367 |
| 5,474,360 | 12/1995 | Chang | 297/367 |
| 5,577,805 | 11/1996 | Glinter et al. | 297/378.12 |
| 5,588,705 | 12/1996 | Chang | 292/367 |

Primary Examiner—Peter M. Cuomo
Assistant Examiner—Rodney B. White
Attorney, Agent, or Firm—Oppenheimer Poms Smith

[57] ABSTRACT

A system for controlling the recline and dumping of a seat has a master unit and a slave unit. The master unit has two base plates that attaches to a seat and pivots with respect to ground. A master lock, which attaches to the base plate, allows the base plates to pivot only when the lock is unlocked. A master seat plate, which connects to the seat and pivots on the master base plate. A latch normally secures the base and seat plates together so that pivoting the master plate pivots the seat plate except when the latches is not latched. The slave unit has a mechanical lock connected with the seat back directly, which allows the seat back and the master base plates to pivot only when both the master lock and the slave lock are unlocked. An input/output device unlocks the slave lock when the latch is unlocked. That allows the seat to dump. The input/output device also unlocks the slave lock when the latch on the master lock is unlocked. That allows the seat back to dump.

12 Claims, 5 Drawing Sheets

SEAT ADJUSTMENT AND DUMPING MECHANISM WITH MEMORY OF ADJUSTMENT

BACKGROUND OF THE INVENTION

1. Field of the Invention

The present invention relates to a seat recline mechanism that includes memory. After pivoting a vehicle seat back forward to allow a passenger to enter the back seat, the seat back returns to its original, adjusted orientation. This invention also relates to a system implementing the recline mechanism in vehicles.

2. State of the Art

The seat backs of the front seats in most vehicles are adjustable. The adjustment allows a person in the front seat to adjust the incline of the seat back to conform to the person's comfort. Many seats also recline back to allow one to recline.

When passengers enter the rear seat of a two-door vehicle, they must pivot the front seat forward. This is called "dumping" the front seat. Most seats have an adjustment mechanism that adjusts the seat back angle to account for the seat occupant's comfort or for reclining the seat. Many seats dump merely by releasing the seat's adjusting mechanism. Therefore, after the passenger enters the back seat, returning the seat back to the upright position just readjusts the seat back. Unfortunately, that means that each time the seat is dumped, the front seat loses its subtle adjustment. Consequently, the user must readjust the seat every time a passenger enters a two-door vehicle past that seat.

Several devices separate dumping from normal adjustments and, therefore, do not lose their adjustment when they are dumped. Thus, after dumping, the seat back returns to its adjusted position that existed immediately before dumping. The following U.S. patents teach the concept of separation of dumping from other seat adjustments: Tamura, U.S. Pat. No. 3,593,069 (1976), Dinkel, U.S. Pat. No. 3,887,232 (1975); Kazaoka, U.S. Pat. No. 4,502,730 (1985); and Terada, U.S. Pat. No. 4,660,886 (1987). These devices are quite complex with many cooperating parts. Complexity adds to cost and the chance of failure. Adding more parts also increases the weight of the mechanism, which runs counter to weight reduction strategies favored by vehicle manufacturers.

SUMMARY OF THE INVENTION

The principal objects of the present invention are to disclose and provide a less complex memory seat adjustment and dumping mechanism. Another object is to disclose and provide a mechanism that can be made lighter than other seat mechanisms. Another object is to disclose and provide a memory seat adjustment and dumping mechanism in a system that can use a master unit and a slave unit for one seat as a way to eliminate redundant parts. A further object is to use a strong mechanical lock for the memory seat adjustment and dumping mechanism and to have parts of the mechanical lock cooperate with the memory function.

The present invention's system for controlling the orientation of a seat back and for dumping the seat back has a master unit and a slave unit. These normally mount on opposite sides of a vehicle seat. The master unit has two base plates attachable to a seat. The base plates also connect to the seat back via the upper arm of a seat plate. The slave-side unit consists of a mechanical lock directly connected to the seat back. The master base plates and slave-side of the seat back pivot together about a common axis with respect to the vehicle.

A master mechanical lock attaches to the master base plates and the slave-side mechanical lock attaches to the seat back. A control subsystem coordinates operation of the locks. It simultaneously locks or unlocks both the master and the slave mechanical locks to perform the recline function. The control subsystem also connects with the dumping mechanism and the slave lock. When the control subsystem is in its closed or locked condition, the slave lock and the dumping mechanism are locked. They prevent the seat plate and the seat back from pivoting. Thus, the seat back's orientation is fixed. When the control subsystem is in its opened or unlocked condition, the seat plate and the slave-side of the seat back can pivot to adjust the seat back to the dumped position.

The mechanical locks are conventional. Each lock has a housing and a rod that translates in the housing. Coil springs in the housing surround the rod. Each coil spring has a normal inside diameter that is less than the rod's outside diameter so that the springs grip the rod. To release the lock, a handle, which contacts the springs, unwind the springs enough to increase their inside diameter so that they release the rod. A strong compression return spring biases the rod out of the housing. Because the slave-side mechanical lock's rod attaches to the slave-side of the seat back, the lock's return springs applies a bias through the rod to the seat back.

A seat plate pivots on the master base plates and connects to the seat back. When the seat back is dumped, the master seat plate pivots with respect to the master base plates. The slave side of the seat back merely pivots.

The master base plate has an arcuate slot with first and second ends. A slide pin slides within the arcuate slot of the master seat plate. A latch mounts on the master base plate such that it can pivot between a latched and unlatched position. The latch has a latch slot that captures the slide pin when the latch is in its latched position and the slide pin is in the first end of the arcuate slot. Because the slide pin is fixed to the seat plate, the latch in its latched position prevents the seat plate from pivoting about the base plate. When the control subsystem remotely unlatches the latch, the latch releases the slide pin allowing the pin to travel in the arcuate slot. That permits the seat plate to pivot with respect to the base plate, which allow the seat to dump. Because the control subsystem also opens the slave-side lock, the return spring, which biases the rod out of the slave mechanical lock housing, helps dump the seat back forward.

The present invention has a double input/single output device ("DISO") as part of the control and actuator system. The control subsystem connects to the master lock directly and to the slave-side lock via the DISO. When a main actuator unlocks both the master- and slave-side locks, one can adjust the seat back. The control subsystem connects to the latch directly and to the slave-side lock via the latch and the DISO. Unlatching the latch of the master side also unlocks the slave lock, but the master lock remains locked when the latch is unlatched. Consequently, when the master seat plate pivots on the master base plates during dumping, the slave side of the seat back pivots. The master base plates remain stationary, however.

As the seat back returns to the position before being dumped, the latch recaptures the slide pin of the seat plate. The geometry of the slide pin and latch holds the latch rotated to its unlatched orientation until the slide pin is at the end of its slot. This only occurs when the seat back fully returns from the dumped position. When the latch does recapture the slide pin, the latch affects the DISO to cause it to lock the slave mechanical lock.

These and other objects of the invention may be seen more clearly from the drawings and the detailed description of the preferred embodiment that follows.

DETAILED DESCRIPTION OF THE PREFERRED EMBODIMENTS

Figures 1, 1A:
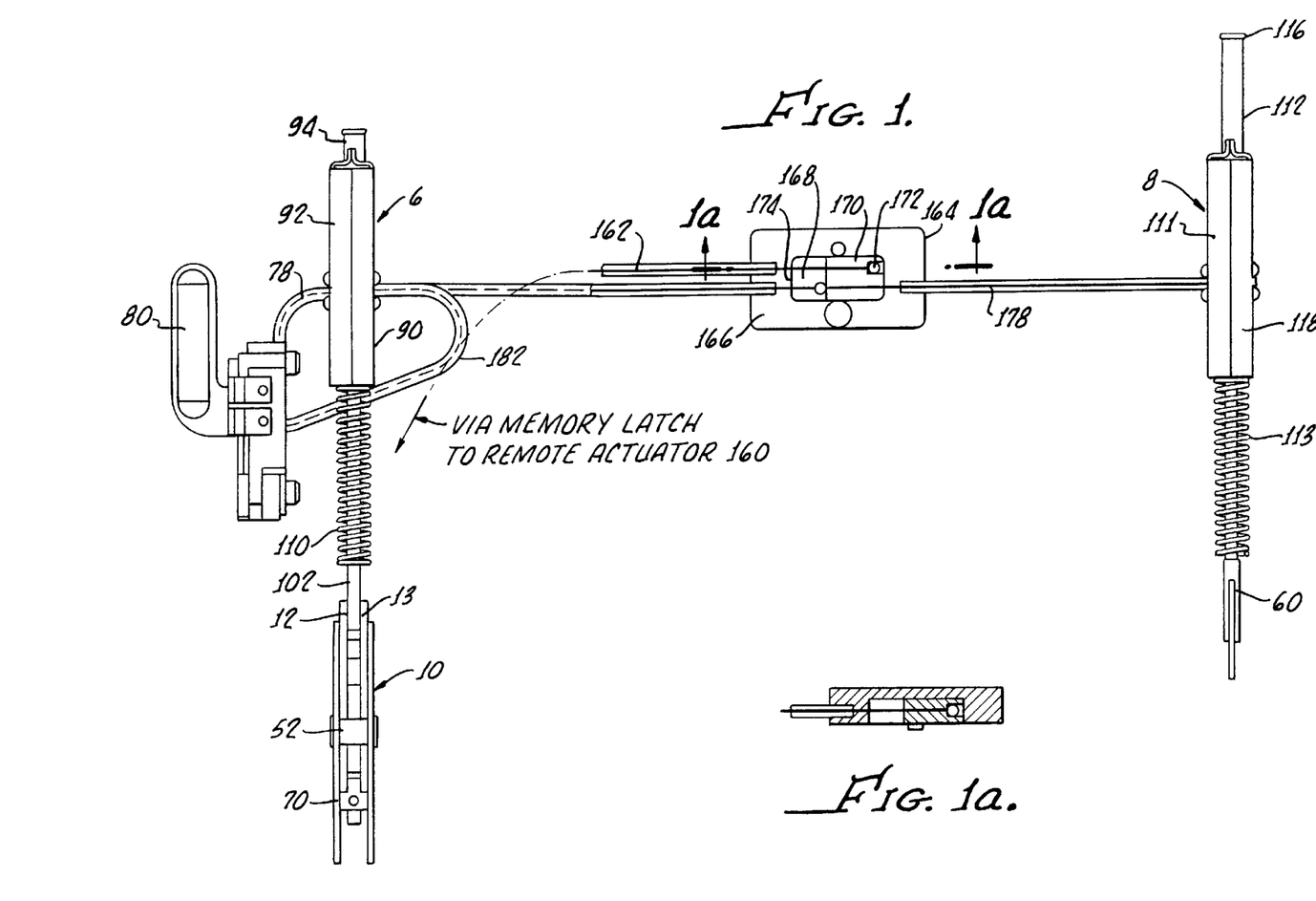
FIG. 1 is a schematic view of an exemplary embodiment of the memory seat recline mechanism of the present invention and includes a plan view of some structure of the invention's recline mechanism.
Figures 2, 2A:
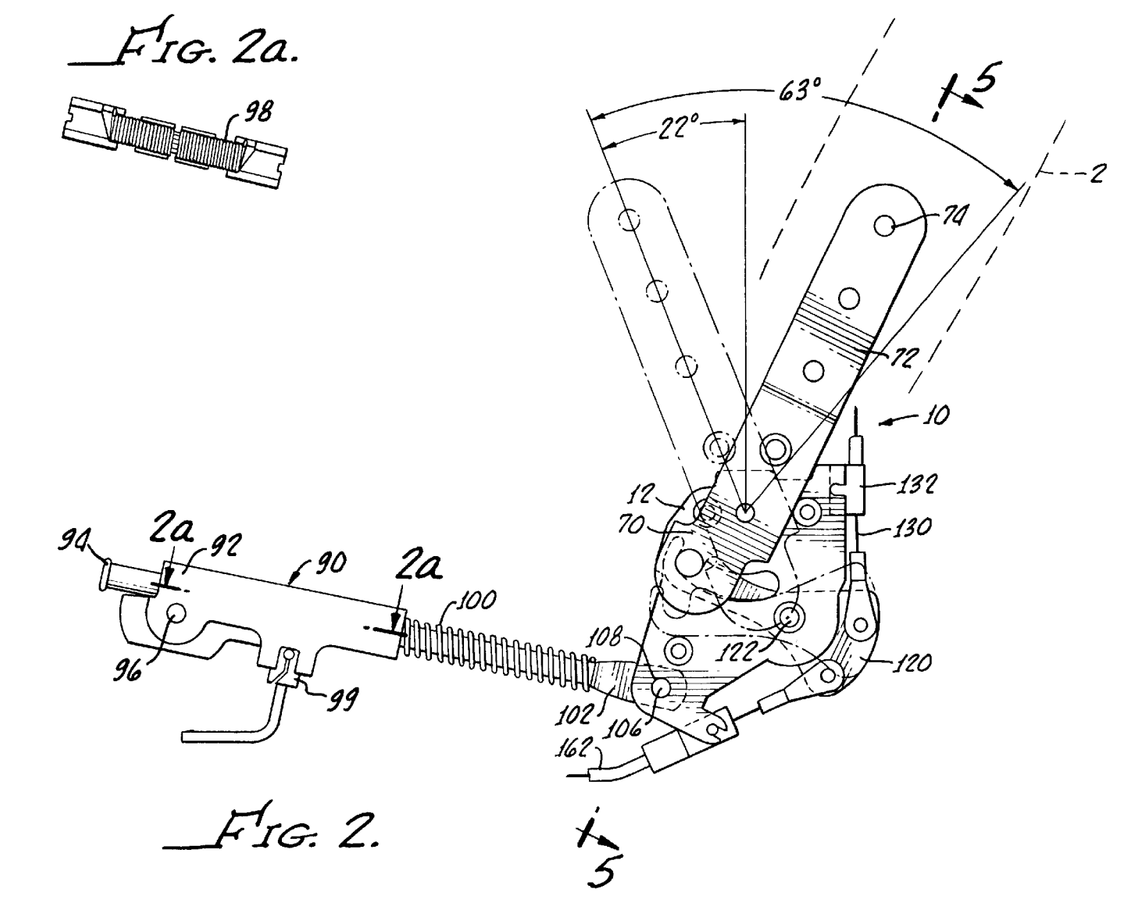
FIG. 2 is a side view of the master side of an exemplary embodiment of the memory seat recline mechanism of the present invention. This view shows the mechanism's attachment to the mechanical lock.
Figure 4:
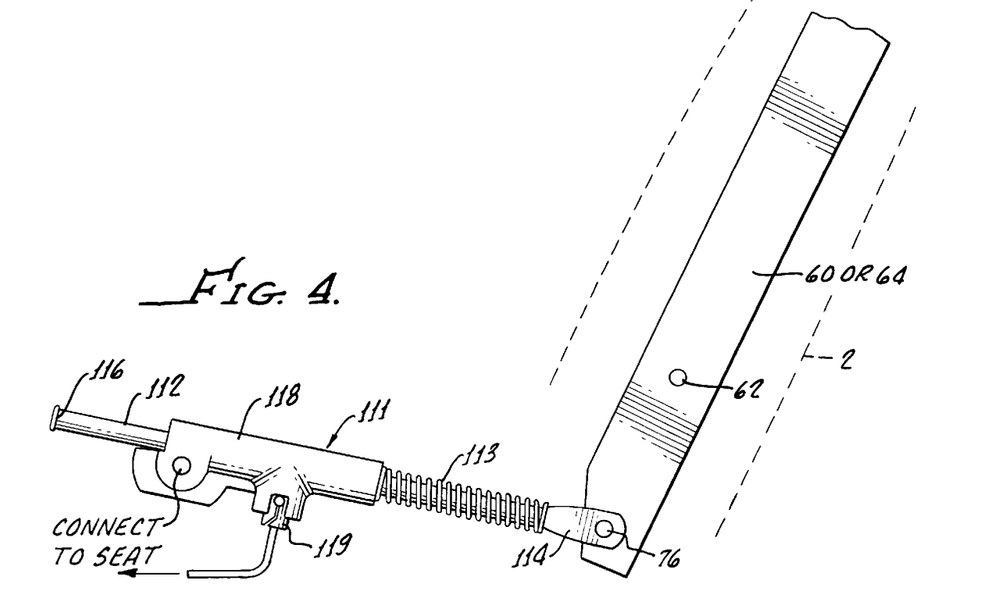
FIG. 4 is a side view of the slave side of the exemplary embodiment of the memory seat recline mechanism of the present invention. This view shows the slave side of the seat back directly connected to its mechanical lock.

The mechanism of the present invention controls the pivoting and dumping of a seat back in a seat. FIGS. 2 and 4 show seat back 2 in phantom mounted for pivoting with respect to vehicle seat 4. The present invention includes a master unit 6 and a slave unit 8, which FIG. 1 shows. In the exemplary embodiment, the two units are about 414 mm apart. Of course, sizes, distances and angles can vary depending on the configuration of the vehicle on which the seat and the mechanism are mounted. As explained in more detail below, both the master and the slave units control normal adjustments of the seat back (e.g., clockwise or counterclockwise pivoting for the driver's or passenger's comfort). The slave unit 8 acts during dumping, but only the master unit 6 contains the memory mechanism of the present invention.

The typical vehicle has two seat controlling and dumping mechanisms—one for the driver's seat and the other for the passenger's seat. Alternatively, only the driver's seat would have the memory mechanism because many drivers require a particular seat back orientation. Passengers may be less particular, and the passenger seat frequently is not occupied. If the vehicle uses two systems, one would normally be a right-hand version and the other is a left-hand version. FIG. 1 is the left-hand version.

Figure 5:
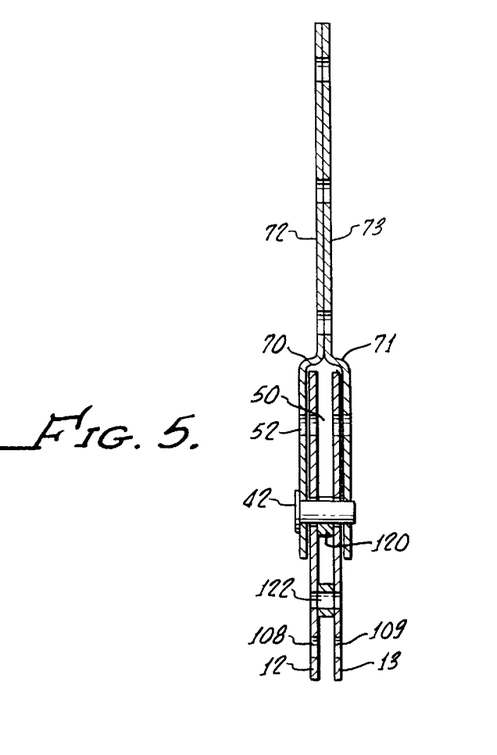
FIG. 5 is a section end view of the master side of an exemplary embodiment of the memory seat recline mechanism of the present invention.

Adjustment mechanism 10 of master unit 8 has a base plate on seat 4 (FIG. 2). The master base plate 12 in the exemplary embodiment is metal for strength. As FIGS. 1 and 5 show, there are two opposing base plates 12 and 13 that are mirror images of each other and work together. They are about 12 mm apart. The remaining discussion often describes only one base plate and the parts associated with the one.

Figure 3:
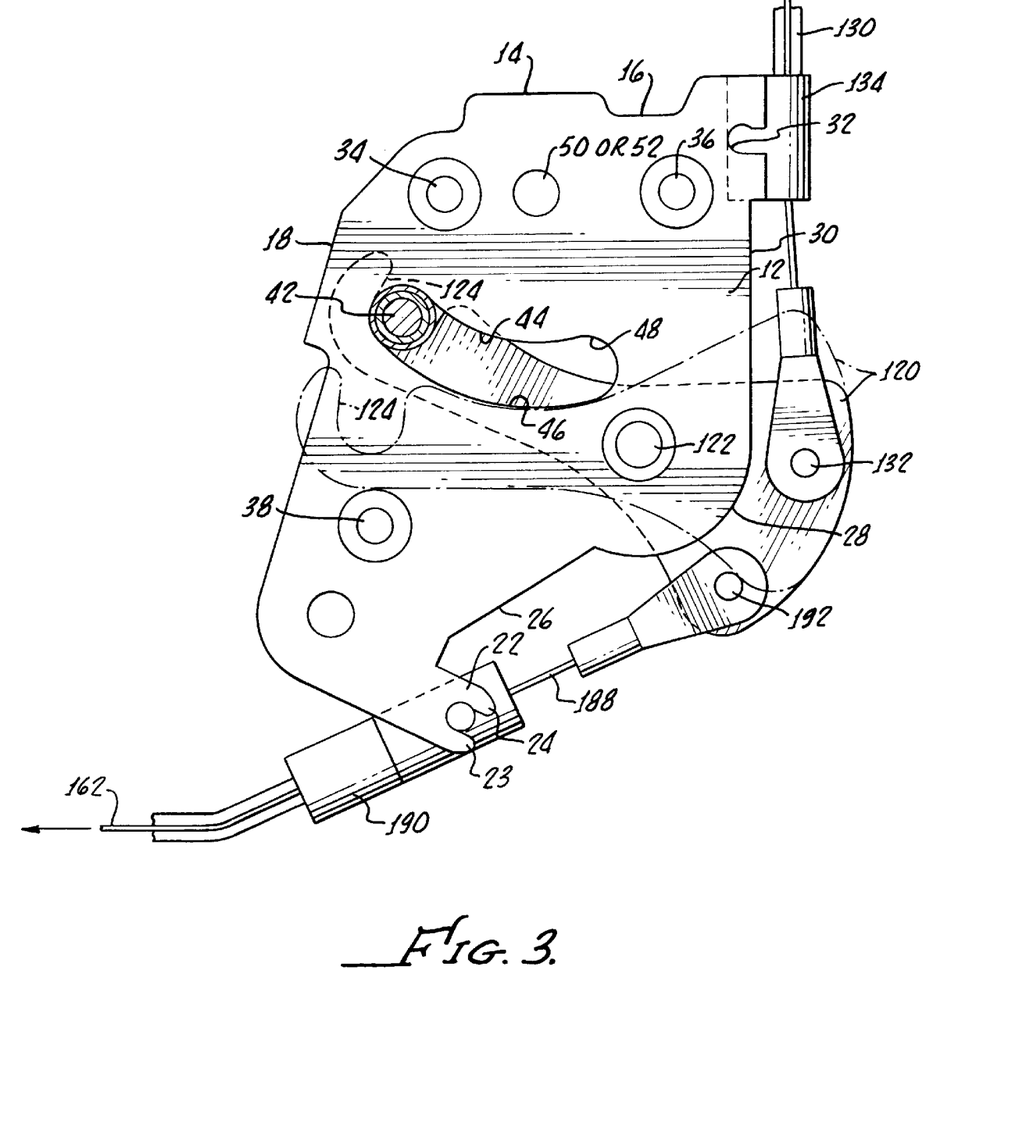
FIG. 3 is a detailed side view of parts of an exemplary embodiment of the memory seat recline mechanism of the present invention.

FIG. 3 shows the embodiment's master base plate 12 most clearly. It includes a top edge 14. The edge may have recesses 16 to accommodate seat parts or for weight reduction. The front (with respect to the seat) edge 18 is angled to the vertical. The bottom front has a flange 20 that extends down and rearward. Flange 20 ends in two short fingers 22, 23 that form a snap-in feature 24 for installing the relevant cable attachment.

Base plate 12 has an angled bottom wall 26 extending from flange 20 to rounded wall 28. That wall extends to rear wall 30. A small notch 32 near top of rear wall 30 also is a snap-in feature for installing a cable attachment. Three rivets 34, 36 and 38 (FIG. 3) extend between the opposing master base plates 12 and 13 (FIG. 5). The distance from the top edge to the end of finger 23 is about 120 mm.

Each master base plate 12 and 13 has an arcuate slot with first and second ends. The slot of base plate 13 is optional, however. In the exemplary embodiment, arcuate slot 44 in base plate 12 (FIG. 3) is an arc of a circle, the center of which is at pivot point 50 (see also FIG. 5). The slot extends about 63° from the first or forward end 46 of the slot to the second or rear end 48 (measured from the center of swing pin 42 resting at either end 46 or 48 of the slot). A pivot pin 52 extends through the base plates 12 and 13 at pivot point 50 (FIGS. 3 and 5). The pin's function is explained below.

The master base plates 12 and 13 can pivot together with respect to the vehicle. That pivoting allows the seat back 2 to be adjusted for the driver's or passenger's comfort. A seat plate, which mounts for pivoting on the base plate, connects to the vehicle seat back. The master seat plates 70 and 71 (FIGS. 1 and 5) of the exemplary embodiment will be described in more detail below. Briefly, upper arms 72 and 73 (FIGS. 2 and 5) are about 19 mm apart in the vicinity of the base plates. The upper arms curve together (FIG. 5) and are integral with the rest of seat plates 70 and 71. Mounting holes 74 in the seat plate allow the upper arms to be bolted to the master side of the seat back 2.

The seat plates normally move when the base plates pivot. Therefore, when the base plates pivot about pin 52, the seat plates 70 and 71 pivot with the base plate. Accordingly, adjusting the angular position of the base plates about pin 52 sets the angular position of the seat plates and, therefore, the seat back.

One end of a mechanical lock attaches to the base plates at a location spaced from the base plates' pivot (FIG. 2). The lock's other end is fixed on the vehicle. In the exemplary embodiment, mechanical lock 90 may be one of many available mechanical locks. P.L. Porter Co. of Woodland Hills, Calif. sells the preferred lock under the mark MECHLOK, Model Nos. MM 65, MM 85 and others. C.R. Porter, U.S. Pat. No. 5,441,129 (1995), entitled "Precision Linear Mechanical Lock," assigned to P.L. Porter Co., also discloses an acceptable mechanical lock. The mechanical locks are very strong. Not only are they part of the adjustment and dumping mechanism of the present invention, their strength holds the seat back upright during a crash.

The lock has a housing 92 and a rod 94 translating within and extending out of the housing. The housing has an attachment hole 96 for attaching the housing to part of the vehicle. The housing has a mechanism that normally secures the rod to the housing. In the MECHLOK and in the referenced patent, the locking mechanism comprises a pair of coil springs. FIG. 2 partially show one such spring 98. The springs have a normal inside diameter less than the rod's outside diameter. Consequently, the spring normally secures the rod in the housing. When one moves a lever 99 on the housing, spring 98, which connects to the lever, unwinds to increase its inside diameter and release the rod 94.

One end 100 of rod 94 has a flange 102 (FIG. 2). A pin 106 extends through opening in the flange and through opening 108 in the master base plate 12 (FIG. 2). Pin 106 also extends through a corresponding opening in the opposing base plate 13. When one releases lever 99 on the lock's housing 92, rod 94 can translate within the housing. Movement of the rod causes base plates 12 and 13 to pivot about pin 52. Because the seat plates 70 and 71 and seat back 2 pivot with the base plates, releasing the lock 90 allows for seat back pivoting adjustment. Compression spring 110 extends between the housing 92 and flange 102 of the rod to bias the rod to the right (as seen in FIG. 2). This urges base plate 12 counterclockwise and the seat back 2 more upright.

Based on the length of rod 94 and the distance between the base plates' pivot point 50 and opening 108, the seat back in the exemplary embodiment can move from vertical to a 41° recline. Different vehicle configurations and the perceived needs of drivers and passengers allow for different maximum recline angles.

Swing pin 42 mounts on seat plates 70 and 71 and extends through arcuate slot 44 (FIGS. 2 and 3). Part of the swing pin may extend through an arcuate slot of base plate 13 (FIG. 5). When the seat plates 70 and 71 pivot relative to base plates 12 and 13 in a manner described below, the swing pin transverses arcuate slot 44. Note that pin 52 defines a common axis for the seat plates and the base plates.

The memory adjustment and dumping seat mechanism of the present invention also includes a memory latch pivotally mounted on the base plate between a locked and unlocked position. In the exemplary embodiment, memory latch 120 is best shown in FIG. 3, but FIG. 5 shows that the latch mounts between base plates 12 and 13. The memory latch mounts on pin 122 which permits it to pivot. The pin extends through openings in base plates 12 and 13.

FIG. 3 shows latch 120 in two positions, latched and unlatched. The memory latch has a latch slot for receiving swing pin 42 when the latch is in its locked position and the swing pin is in the first end 46 of the arcuate slot 44. In FIG. 3, the memory latch's locked position is its most clockwise orientation. In that position, latch slot 124 receives the swing pin and secures it to the first end of the slot. Memory latch 120 pivots about pin 122. Swing pin 42 can travel through 22° to 63° in the arcuate slot. Thus, the arcuate slot acts as a limiting means to limit how far forward the seat back can dump. The pin about which the memory latch pivots is an additional 3° beyond the second end of the slot. This position is advantageous because it ensures that the swing pin will be able to hold latch 120 open before relatching. This feature avoids having the slave lock re-open and return the seat back.

When one pivots memory latch 120 counterclockwise (FIG. 3) in a manner described below, the memory latch releases swing pin 42. Therefore, the swing pin can translate freely within arcuate slot 44. To dump the seat, the user pivots the seat back counterclockwise (forward) after releasing the latch. This causes the swing pin to move to the right (FIG. 2) within the arcuate slot. As explained below, most of the force of dumping comes from the compression spring 113 of the slave mechanical lock 111.

Because of the slot's dimensions, the seat back can dump about 22° forward from vertical. This angle is predetermined and is limited so that the seat back does not strike the steering wheel.

Note that as the seat dumps, mechanical lock 90 remains locked so base plate remains stationary. When the seat back is pivoted back toward its pre-dumping position, the swing pin reaches the first end 46 of the arcuate slot. In that location, the memory latch pivots clockwise so that the latch slot 124 receives the swing pin. Because the base plate has remained stationary while the seat was dumped, the seat back returns to the orientation it had immediately before dumping.

Once latch 120 is unlatched from the swing pin 42 and the swing pin moves to the right in slot 44, the swing pin blocks clockwise rotation of the latch. Therefore, until the seat back returns to its position before dumping, the latch is held in its unlatched position. This is important for the control subsystem described below.

A release attaches to the memory latch for pivoting the memory latch between its locked and unlocked positions. In the exemplary embodiment, the release is a cable 130 attached to fitting 132 on the latch (FIGS. 2 and 3). The fitting is opposite pivot pin 122 from latch slot 124 (FIG. 3). Thus, pulling up on cable 130 pivots latch 120 counterclockwise. One could mount the cable on other places on the latch on either side of pivot pin 122. The cable would pull down if it mounts to the left (FIG. 3) of the pivot pin. Also, a cable is an inexpensive way to pivot the memory latch remotely. One also could use a relay or other electromechanical device to pivot the memory latch remotely. The latch also can be designed to be actuated directly by the operator's foot or hand.

Cable 130 passes through a fitting 134, which attaches to notch 32 on the base plate. The cable then passes to a remote actuator 160 (shown schematically in FIG. 1). A person's activation of the actuator pulls the cable, which, in turn, pivots the memory latch counterclockwise to release the swing pin 42.

A spring may bias the latch to its latched position. In the FIG. 7 embodiment, which is not a preferred one, a helical spring 140, which is in tension, extends between fitting 142 on the latch and fitting 144 on finger 146 of the base plate. The spring biases the memory latch clockwise and urges it to the latched position. The system that has been described in reference to FIGS. 1–6 biases the latch differently.

The slave side 8 of the present invention does not have separate base plates and seat plates. Instead, it has a direct connection between the slave lock 110 and the slave plate 60 which is part of the slave side of seat back 2. Plate 60 pivots on pivot 62 (FIG. 4). The pivot is aligned with pin 62. Therefore, the following elements all pivot about aligned axes: a) the slave plate 60 on the slave side of the seat back 2; b) master base plates 12 and 13; and c) master seat plates 70 and 71. Consequently, the seat back 2 pivots about a single axis. The slave plate 60 may have a series of mounting holes 64 for attaching the slave pivot to structure on the slave side of the seat back.

The mechanical locks 90 and 110 are very similar. Rod 112 of slave-side mechanical lock 110 has a flange 114 that attaches to a pin 76 through the slave plate 60. Thus, when one releases lock 111 and latch 120, the seat back can pivot about pins 52 and 62.

The end 116 of the rod that extends forward of housing 118 (FIG. 4) is longer than the corresponding rod of lock 90. That is because rod 112 of the slave-side mechanical lock 111 must traverse farther during dumping. Remember that during dumping, the master base plates 12 and 13 (FIGS. 1 and 2) remain stationary and mechanical lock 90 remains locked. Consequently, rod 94 does not move during dumping. On the slave side, however, the mechanical lock 112 is unlocked during dumping. Therefore, as seat back 2 pivots counterclockwise beyond the vertical, end 116 of the rod must continue moving to the right (FIG. 4). Accordingly, it must be long enough to transverse the housing fully.

Mechanical lock 111 also has a spring 113 extending between the housing 118 and flange 114 of the rod. The spring is compressed when the seat back reclines (i.e., pivoted clockwise in FIG. 4). In compression, the spring biases the rod to the right (as seen in FIGS. 1 and 4), which urges the seat back counterclockwise or toward the vertical when the seat is reclined back and toward the dumped position during dumping.

Spring 113 is under sufficient pre-compression that even when the seat back is dumped (counterclockwise in FIG. 4), the spring continues acting in compression. As explained below, the compressive force of spring 113 of the slave lock 111 helps seat back 2 dump forward and holds it in the dumped position.

The system of the present invention also has a control subsystem that provides the following operation. When one unlocks the master mechanical lock 90 to adjust the seat back 2, the control subsystem also unlocks the slave lock 111. Consequently, both the base plates 12 and 13 may pivot for adjusting the angle of the seat back. Similarly, when one unlatches latch 120 for dumping the seat, the control subsystem also unlocks the slave lock 110. Master lock 90 remains locked. Therefore, seat plates 70 and 71 may pivot relative to their stationary base plates 12 and 13. Slave plate 60 also can pivot. Therefore, the seat back can dump. Also, once the slave mechanical lock opens and the latch is unlatched for dumping, the slave lock stays unlocked until the latch relatches. When latch 120 is unlatched, the swing pin 42 travels over the surface 126 and blocks the latch from rotating clockwise. That last control function is important because the slave lock cannot lock up when the seat back is dumped. If it did occur, the seat would be locked in the dumped orientation.

In the exemplary embodiment, the control subsystem comprises a latch cable 162 that cooperates with remote dump actuator 160 and latch 120 (FIGS. 1 and 2). Latch cable 162 passes through a fitting 190 (FIG. 3), which mounts in slot 24 on base plate 12. Cable 130, which connects to latch 120, extends to a remote actuator 160 (FIG. 1). The remote actuator may be a button, a mechanical switch or lever. It also could operate electrically. The actuator preferably mounts on the rear of the seat back within reach of a person in the back seat or of a person trying to enter the back seat.

Latch cable 162 extends from remote actuator 160 to a double input/single output ("DISO") mechanism 164 (FIG. 1). The DISO mechanism comprises a housing 166. The housing has a central space 168 that receives a slide block 170. Input cable 162 passes into space 168 and attaches to one wall 172 of the slide block 170. When one throws the remote actuator 160, input cable 162 is pulled to draw slide block toward end wall 174 (in the direction of the arrow in FIG. 1).

Figure 6:
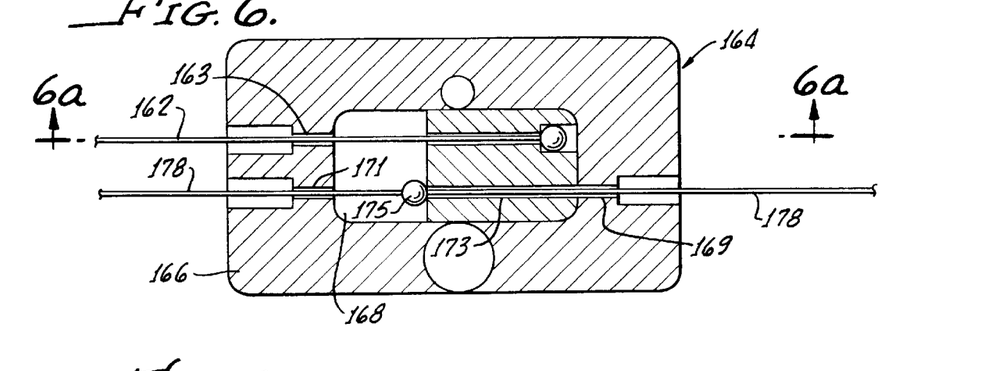
FIG. 6 is a detailed plan view of the double input/single output (DISO) device that is part of the present invention's control subsystem.
Figure 6A:
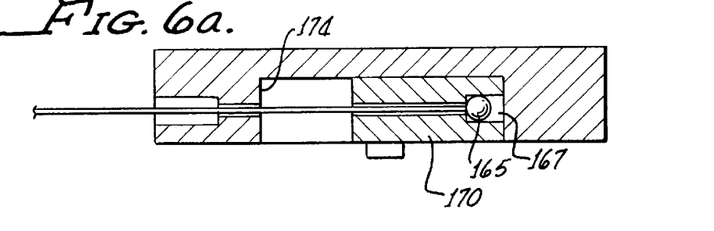
Figure 7:
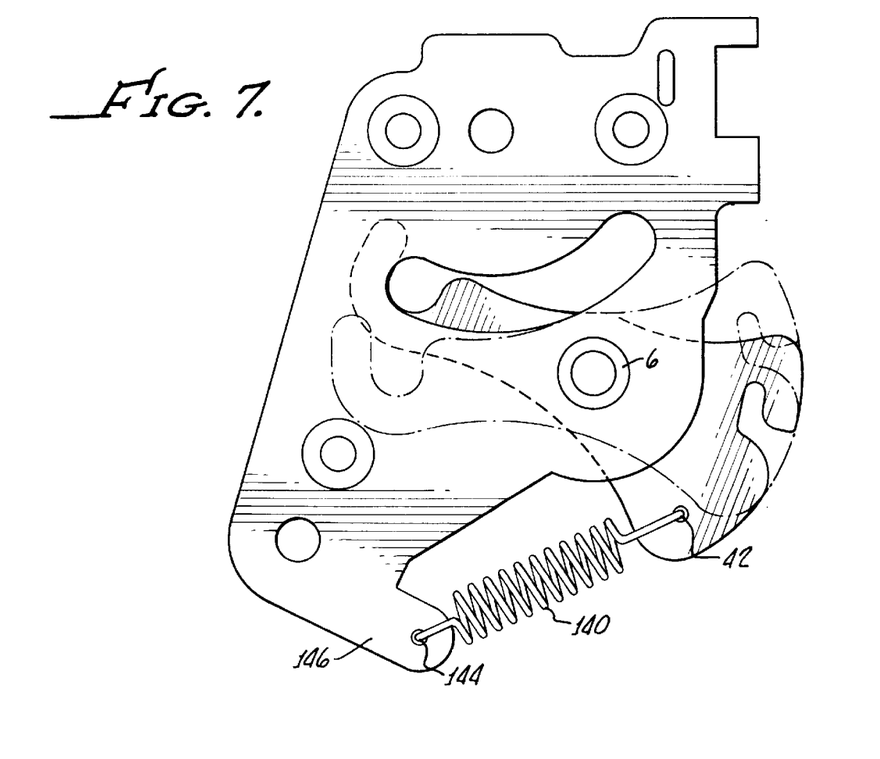
FIG. 7 is A detailed side view of parts of another exemplary embodiment of the master side of the memory seat recline mechanism of the present invention.

Actuator handle 180 is accessible to the driver or passenger sitting in the respective seat. Output cable 178 extends from the actuator handle through passages 169 and 171 in the DISO housing 166 to the lever 119 of slave lock 111 (FIGS. 1, 4 and 6). Cable 178 also passes through a passage 173 in slide block 170. Another small ball 175 attaches to cable 178 at the end of the slide block.

When one actuates remote actuator 160 to unlatch latch 120 to initiate dumping, latch 120 (FIG. 3) pulls input cable 162 to the left in FIG. 3 and in the direction of the arrow in FIGS. 1 and 6. The cable pulls ball 165, which pulls slide block 170 in the arrow's direction. Consequently, the slide block moves ball 175 in the direction of the arrow. The ball, in turn, pulls output cable 178, which pulls lever 119 of the slave lock 111 to unlock the lock. Therefore, unlatching latch 120 simultaneously unlocks the slave lock 111, which releases slave plate 60. Therefore, the seat back 2 can dump.

Another cable 182 extends from handle actuator 180 to the lever 99 of master mechanical lock 90 (FIG. 1). When one actuates handle actuator 180, cable 182 unlocks the master lock. Simultaneously, input cable 178, which extends through DISO 164, pulls the lever 119 of slave mechanical lock 111 to unlock that lock. Therefore, using the handle actuator 180 unlocks master lock 90 and slave lock 111 together. Therefore, the user can adjust the position of the seat back.

When latch 120 is unlatched, swing pin 42 travels over surface 126 and blocks the latch from rotating clockwise. When the lock is in its unlatched orientation (FIG. 3), cable 162 maintains slide block 170 toward end wall 174 (FIG. 6). Consequently, the slide block holds ball 175 toward the end wall. That causes cable 178 to keep the slave mechanical lock unlocked. Therefore, as long as the latch is unlatched, the slave mechanical lock must stay unlocked. Accordingly, when the seat back is dumped, it returns to its upright position without the slave mechanical lock locking. Of course, if the slave lock did lock, the seat back would stay dumped.

When the seat back returns to its pre-dumping position, slide pin 42 returns to the first end 46 of arcuate slot 44. When that occurs, latch 120 can pivot clockwise and recapture the pin. The latch's clockwise rotation releases latch cable 162. That permits slide block 170 to slide in the direction opposite the arrow. The slide block releases cable 178 to release lever 119 of the slave lock. Therefore, when the seat plates 70 and 71 are latched because the seat back is returned to its pre-dumping position, slave lock 111 simultaneously locks.

The control subsystem, therefore, performs the following valuable tasks: a) it simultaneously unlocks the master and slave locks when the seat is adjusted; b) it simultaneously unlatches the seat plate and unlocks the slave lock when the seat is dumped; 3) it simultaneously locks the slave lock when the latch recaptures the slide pin; and 4) it prevents the slave lock from locking as long as the dumping mechanism is dumping the seat.

Many modifications and alternate embodiments will occur to those skilled in the art. Therefore, the applicant intends that the invention is limited only in terms of the appended claims.

I claim:

1. A mechanism for controlling reclining and dumping of a seat back of a seat, the mechanism comprising:

a base plate attachable to a seat and pivotable with respect to ground, the base plate having an arcuate slot with first and second ends;

a lock attached to the base plate, the lock having a locked condition preventing the base plate from pivoting and an unlocked condition permitting the base plate to pivot;

a seat plate connectable to the seat and pivotally mounted on the base plate, the seat plate having a slide pin sliding within the arcuate slot;

a latch mounted on the base plate for pivoting between a latched and unlatched position, the latch having a latch slot receiving the slide pin when the latch is in its latched position and the slide pin is in the first end of the arcuate slot; and a release attached to the latch for pivoting the latch between its latched and unlatched positions.

2. The mechanism for adjusting and dumping a seat of claim 1 wherein the lock comprises a housing spaced from the base plate and a rod traversing the housing and extending between the housing and the base plate.

3. The mechanism for adjusting and dumping a seat of claim 2 wherein the base plate pivots at a pivot point, the rod attaching to the base plate on the other side of the latch from the pivot point.

4. The mechanism for adjusting and dumping a seat of claim 1 further comprising a surface on the latch and intersecting the slide pin when the slide pin is away from the first end.

5. A mechanism for allowing pivoting and dumping of a seat back relative to a seat, the mechanism including a base plate; locking means attached to and spaced from the base plate having a locked condition preventing the base plate from pivoting and an unlocked condition allowing the base plate to pivot; a seat plate means pivoting on the base plate and attached to the seat back for pivoting the seat back with respect to the base plate; limiting means on the base plate and receiving a portion of the seat plate means, the portion movable within the limiting means; and a latching means on the base plate and pivoting between a latched position against the portion of the seat plate means and a dumping position releasing the portion of the seat plate, the latching means in its latched position blocking movement of the portion of the seat plate means relative to the base plate, and the latching means in its dumped position permitting movement of the portion of the seat plate means relative to the base plate.

6. A system for controlling reclining and dumping of a seat, the seat having a seating surface and a seat back;
   a master unit and a slave unit, the master unit comprising a master base plate attachable to a seat and pivotable with respect to ground;
   a master lock attached to the master base plate, the master lock having a locked condition preventing the master base plate from pivoting and an unlocked condition permitting the master base plate to pivot;
   a master seat plate connectable to the seat back and pivotally mounted on the master base plate,
   a latch mounted on the master base plate for pivoting between a latched position securing the master seat plate to the master base plate and an unlatched position releasing the master seat plate from the master base plate; and
   the slave unit comprising a slave lock attachable to the seat back, the slave unit being spaced from the master slave base plate, the slave lock having a locked condition preventing the slave pivot plate from pivoting and an unlocked condition permitting the slave pivot plate to pivot;
   an input/output device, an actuator connected to the input/output device, the input/output device being connected to the master lock and to the slave lock such that activating the actuator unlocks the master lock and the slave lock.

7. The system of claim 6 further comprising an actuator handle, the input/output device comprising a first cable extending from the actuator handle to the slave lock and a second cable extending from the actuator handle to the master lock, the actuator handle moving the first and second cables together to unlock the master and slave locks simultaneously.

8. The system of claim 6 further comprising a latch cable attached to the latch and being pulled when the latch releases the master seat plate from the master base plate, the latch cable attaching to the input/output device; an actuator handle, the input/output device comprising a first cable extending from the actuator handle to the slave lock and a second cable extending from the actuator handle to the master lock, the actuator handle moving the first and second cables together to unlock the master and slave locks simultaneously; the input/output device transmitting movement from the latch cable to the first cable.

9. The system of claim 8 wherein the input/output device comprises a housing, a slide block sliding in the housing, the latch cable being attached to the slide block, the first cable extending through the housing and the slide block, a blocking member on the first cable adjacent the slide block and moving away from the slide block when the actuator handle pulls the first cable, the slide block moving the blocking member and the first cable when the latch cable moves the slide block.

10. The system of claim 6 wherein the master base plate has an arcuate slot with first and second ends, the master seat plate having a master slide pin sliding within the arcuate slot.

11. The system of claim 10 wherein the latch has a latch slot receiving the slide pin when the latch is in its latched position and the slide pin is in the first end of the arcuate slot; a release attached to the latch for pivoting the latch between its latched and unlatched positions.

12. In a method for controlling adjusting and dumping of a seat in which the seat has a pivoting seat back;
   a master unit having a base plate, a seat plate and a latch normally holding the base plate and seat plate together, the seat plate pivoting with the base plate to adjust the angle of the seat back when the latch holds the base plate and seat plate together; the seat plate pivoting with respect to the base plate when the latch releases the seat plate from the base plate; the master unit also having a master lock which has a locked condition normally preventing the base plate from pivoting and an unlocked condition allowing the base plate to pivot;
   a slave unit comprising a slave lock connected t a slave plate on the seat, the slave lock has a locked condition normally preventing the slave plate from pivoting and an unlocked condition allowing the base plate to pivot to adjust the angle of the seat back; the method comprising:
   unlocking the slave lock when the master lock is released to permit the slave plate and the base plate to pivot simultaneously; and
   unlocking the slave lock when the latch releases the seat plate from the base plate to permit simultaneous pivoting of the seat plate on the base plate and pivoting of the slave plate.

* * * * *